Patented Sept. 11, 1951

2,567,822

UNITED STATES PATENT OFFICE 2,567,822

VAT DYESTUFFS

Eduard Moergeli, Neuewelt, near Basel, Switzerland, assignor to Ciba Limited, Basel, Switzerland, a Swiss firm No Drawing. Application June 20, 1949, Serial No. 100,297. In Switzerland July 1, 1948

6 Claims. (Cl. 260—316)

The present invention relates to vat dyestuffs of the anthraquinone series and more particularly to such vat dyestuffs containing two anthraquinone nuclei interconnected by a carbazole linkage, which are commonly referred to as a:a'-dianthrimide carbazoles. It is an object of the present invention to provide new dyestuffs of the said series which combine valuable shades with good affinity for cellulosic fibers and good fastness to wet treatments as well as other desirable properties.

The invention is based on the observation that vat dyestuffs are produced when an a:a'-dianthrimide which is substituted in at least one further a-position by an ortho-fluorobenzoylamino group, is reacted with carbazolizing agents.

The a:a'-dianthrimides serving as starting materials for the present process can be produced in the known manner for example by condensing together a 1-aminoanthraquinone and a 1-halogenanthraquinone. In this reaction the anthraquinone components must be so selected that at least one, and if desired both, is or are substituted in a further a-position by an ortho-fluorobenzoylamino group. In the production of the dianthrimides it is of particular value that the fluorine atom of the ortho-fluorobenzoylamino group in ortho-position to the carbonyl group is very stable even in the presence of copper and copper salts, which was not to be expected from a reference to the work of Firmin Govaert, Chemisches Zentralblatt 1930, vol. I, page 973. As examples of 1-halogenanthraquinones with ortho-fluorobenzoylamino groups may be mentioned 1-chloro-4-and 1-chloro-5-(ortho-fluorobenzoylamino)-anthraquinone. As 1-aminoanthraquinones with ortho - fluorobenzoylamino groups there are concerned for example 1-amino-4- and 1-amino-5-(ortho-fluorobenzoylamino)-anthraquinone.

By condensation of such components together there are obtained a:a'-dianthrimides which are substituted in each anthraquinone residue by an ortho-fluorobenzoylamino group.

When there are condensed with the above components 1-aminoanthraquinones or 1-halogenanthraquinones respectively, which contain no ortho-fluorobenzoylamino groups, for example 1-aminoanthraquinone or 1-chloroanthraquinone itself, or such components as contain a substituent different from the ortho-fluorobenzoylamino group, a:a'-dianthrimides are obtained which contain an ortho-fluorobenzoylamino group in and 1-chloroanthraquinones which contain in 4-, 5-, or 8-position any suitable acylamino group, for example a benzoylamino group free from substituents.

In accordance with the invention dianthrimides obtained as described above are reacted with carbazoling agents. As such may be employed in known manner in accordance with the starting materials employed aluminum chloride, titanium tetrachloride or concentrated sulphuric acid. The use of concentrated sulphuric acid is in general indicated when the dianthrimides employed contain two benzoylamino groups, irrespective of the fact as to whether one or both benzoyl groups contain fluorine. In the application of dianthrimides which contain only one benzoylamino group, the application of aluminum chloride is effective, in which case in known manner diluents of organic nature such as pyridine or nitrobenzene may be present in the reaction, or also the application of aluminum chloride-sulphur dioxide addition products.

The products obtained according to the present process constitute valuable vat dyestuffs. They can be employed by customary methods for the dyeing and printing of the most varied fibers of animal and in particular of vegetable nature, including wool, silk and in particular cotton, linen, artificial silk and cellulose wool from regenerated cellulose and in addition superpolyamide fibers.

It has indeed already been proposed for the manufacture of vat dyestuffs to acylate vattable amines with certain halogen benzene carboxylic acids and it is also already known that a substitution in ortho-position to the carbonyl residue with chlorine or bromine in many cases effects a displacement of the color shade towards yellow. It was, however, not to be expected that by replacement of chlorine or bromine by fluorine there would be effected in many cases a still further lightening of the color shade together with an increase of the affinity of the dyestuffs obtained for the cotton fiber and also an increase of the wet fastness properties for example fastness to bucking.

The following examples illustrate the invention the parts and percentages being by weight unless otherwise stated and the relation of parts by weight to parts by volume being the same as that between the kilogram and the liter.

*Example 1* of 1-aminoanthraquinone, 20 parts of sodium carbonate, 1 part each of cuprous chloride and copper acetate and 280 parts by volume of nitrobenzene is stirred for 16 hours at 200–205° C. After cooling, the reaction product is filtered with suction, washed with nitrobenzene and alcohol and treated with dilute hydrochloric acid for removal of the inorganic salts, being thereupon washed with water and dried. The 5-(ortho-fluorobenzoylamino)-1:1'-dianthrimide is obtained in good yield as a uniform red crystal powder.

For the carbazole ring closure 10 parts of the dianthrimide are stirred for 24 hours at 20° C. in a solution of 36 parts of aluminum chloride, 2 parts by volume of orthofluorobenzoyl chloride and 100 parts by volume of nitrobenzene. The reaction product is poured into a mixture of ice and hydrochloric acid and after addition of 5 parts of sodium perborate the whole is stirred for about an hour. Thereupon the volatile organic constituents are distilled off in steam and the dyestuff filtered with suction and washed until neutral. It is to be recommended to subject the dyestuff obtained to a preliminary purification by treatment with sodium hypochlorite and then to recrystallize it from sulphuric acid.

The pure dyestuff of the formula

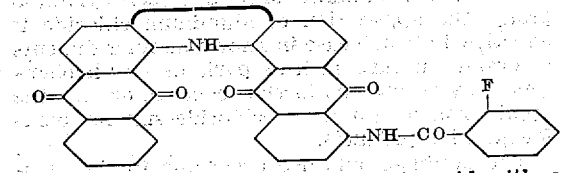

dissolves in concentrated sulphuric acid with a blue color and dyes cotton from a yellow brown vat in bright fast yellow shades.

Example 2

A mixture of 6 parts of 1-amino-5-(ortho-fluoro-benzoylamino)-anthraquinone, 6.4 parts of 1-chloro-5-(ortho-fluorobenzoylamino)-anthraquinone, 4 parts of sodium carbonate, 0.2 part each of cuprous chloride and copper acetate and 70 parts by volume of nitrobenzene is stirred for 14 hours at 205° C. After working up as described in Example 1 there is obtained the 5:5'-di-(ortho-fluorobenzoylamino)-1:1'-dianthrimide as a red brown crystal powder in excellent yield.

With stirring 10.4 parts of the dianthrimide thus obtained are introduced into 100 parts of 92 per cent. sulphuric acid. The whole is stirred first for 6 hours at 40° C. and then for 18 hours at room temperature. In a test portion under the microscope there can then be recognized a crystal mixture consisting of long yellow and shapeless olive crystals. (If crystallisation has not taken place the solution should be carefully diluted with a sulphuric acid of lower concentration.) The crystal mixture is filtered with suction, washed with a little 90 percent. and then with 85 per cent. sulphuric acid and then introduced into ice water containing sodium nitrate and stirred until a bright yellow color is produced. The product is then filtered and the residue washed with water until neutral and dried.

The dyestuff of the formula

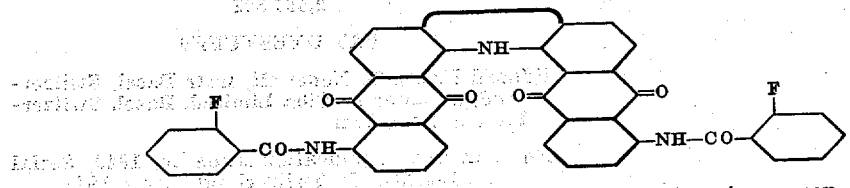

which is a yellow powder, dissolves in concentrated sulphuric acid with a blue color and dyes vegetable fiber from a brown hydro-sulphite vat in powerful, clear, golden yellow shades of very good fastness properties.

If there is employed for the production of the dianthrimide instead of 1-amino-5-(ortho-fluorobenzoylamino)-anthraquinone the equivalent quantity of 1-amino-5-benzoylamino-anthraquinone, there is obtained the 5-benzoylamino-5'-(ortho-fluorobenzoylamino)-1:1'-dianthrimide, which by the method described yields a carbazole derivative which dyes in somewhat more reddish golden yellow shades.

The 1-chloro-5-(ortho-fluorobenzoylamino)-anthraquinone is obtained by acylation of 1-chloro-5-amino anthraquinone with ortho-fluorobenzoyl chloride, for example in ortho-dichlorobenzene at boiling temperature. It crystallizes from the solvent in yellow crystals and melts at 230–230.5° C. (uncorrected).

Example 3

11 parts of 1-chloro-4-(ortho-fluorobenzoylamino)-anthraquinone, 9 parts of 1-amino-5-benzoylaminoanthraquinone, 5 parts of sodium carbonate, 0.5 part each of cuprous chloride and copper acetate and 100 parts by volume of nitrobenzene are stirred for 16 hours at 200–205° C. Working up is carried out as described in Example 1 and there is obtained in good yield and purity the 5-benzoylamino-4'-(ortho-fluorobenzoylamino)-1:1'-dianthrimide as a dark brown crystal powder.

5 parts of the dianthrimide are stirred for 3 hours at 33–36° C. in 100 parts of 95 per cent. sulphuric acid. The reaction product is poured with stirring in a thin stream on to 500 parts of ice in 250 parts of water and to the suspension 3 parts of sodium perborate added and the whole then stirred overnight and the temperature allowed to rise to about 25° C.

The dyestuff of the formula

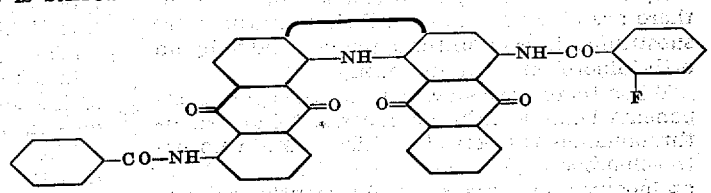

is filtered off and washed until neutral. It dyes the fiber from a brown hydrosulphite vat, after hanging in the air, in brown shades of excellent fastness properties.

By replacing the 1-amino-5-benzoylaminoanthraquinone by the equivalent quantity of 1- amino - 5-(ortho - fluorobenzoylamino)-anthraquinone a carbazole dyestuff is obtained which yields dye shades displaced towards yellow-brown.

1 - chloro - 4 - (ortho - fluorobenzoylamino)-anthraquinone is obtained by acylation of 1-chloro-4-aminoanthraquinone with ortho-fluorobenzoyl chloride. It crystallizes from ortho-dichlorobenzene in yellow crystals and melts at 214.5–215° C. (uncorrected).

*Example 4*

1 part of the dyestuff obtained according to the first and second paragraphs of Example 2 is vatted at 50° C. in 100 parts of water with the addition of 2 parts of sodium hydrosulphite and 4 parts by volume of caustic soda solution of 36° Bé. The stock vat thus obtained is added to a solution of 2 parts of sodium hydrosulphite and 4 parts by volume of caustic soda solution of 36° Bé. in 2000 parts of water. In the dyebath thus produced 100 parts of cotton are dyed in 1 hour at 45–50° C. with the addition of 10 parts of sodium chloride. The cotton is thereupon squeezed out, oxidized in the air, rinsed, acidified, rinsed again and soaped at the boil. It becomes dyed in powerful golden yellow shades.

The term "vat dyestuffs of the $\alpha:\alpha'$-dianthrimide carbazole type" as appearing in the claims is to be understood as excluding compounds containing more than two anthraquinone skeleton or any condensed ring system other than that of the $\alpha:\alpha'$-dianthrimide carbazole of the formula

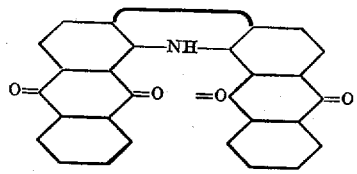

Having thus disclosed the invention, what is claimed is:

1. A vat dyestuff of the $\alpha:\alpha'$-dianthrimide carbazole type wherein at least one further $\alpha$-position of the two anthraquinone nuclei is occupied by an ortho-fluorobenzoylamino group.

2. A vat dyestuff of the $\alpha:\alpha'$-dianthrimide carbazole type wherein each anthraquinone nucleus carries a benzoylamino group in an $\alpha$-position and wherein at least one of the said benzoylamino groups carries a fluorine atom in the benzene radical ortho to the —CO—NH— group.

3. The vat dyestuff of the formula

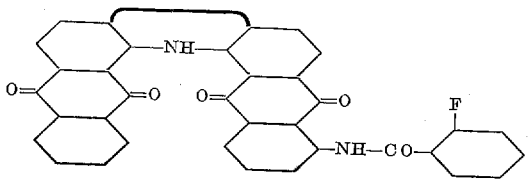

4. The vat dyestuff of the formula

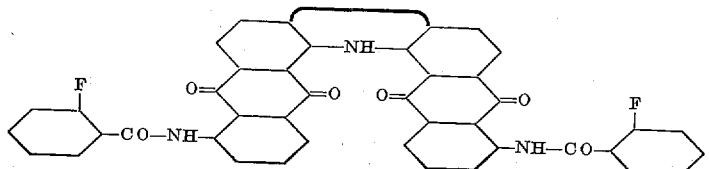

5. The vat dyestuff of the formula

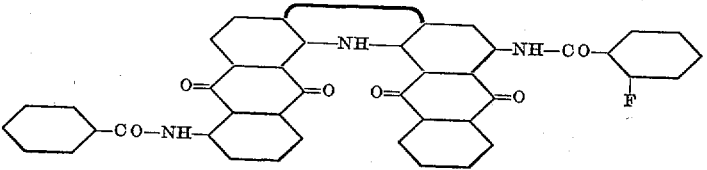

6. The vat dyestuff of the formula

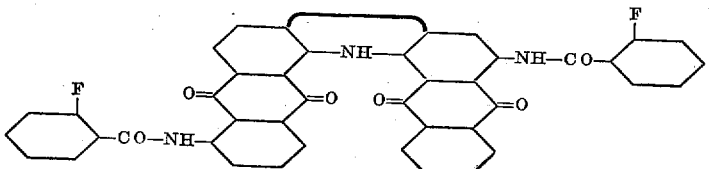

EDUARD MOERGELI.

REFERENCES CITED

The following references are of record in the file of this patent:

UNITED STATES PATENTS

| Number | Name | Date |
|---|---|---|
| 1,856,207 | Bruns et al. | May 3, 1932 |
| 2,284,062 | Mieg et al. | May 26, 1942 |

FOREIGN PATENTS

| Number | Country | Date |
|---|---|---|
| 138,236 | Switzerland | May 1, 1930 |
| 592,268 | Great Britain | Sept. 12, 1947 |

Certificate of Correction

Patent No. 2,567,822 September 11, 1951

EDUARD MOERGELI

It is hereby certified that error appears in the printed specification of the above numbered patent requiring correction as follows:

Column 1, line 13, for "vate" read *vat*; column 2, lines 6 and 7, for "carbazoling" read *carbazolizing*; column 4, line 5, for "nitrate" read *nitrite*; and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*